United States Patent [19]

Foti

[11] 4,139,471
[45] Feb. 13, 1979

[54] SEWAGE TREATMENT UNIT

[76] Inventor: Dominick Foti, 5062 Cornell, Westminster, Calif. 92683

[21] Appl. No.: 867,780

[22] Filed: Jan. 9, 1978

Related U.S. Application Data

[63] Continuation of Ser. No. 720,756, Sep. 7, 1976, abandoned.

[51] Int. Cl.² .............................................. C02C 1/08
[52] U.S. Cl. ...................... 210/170; 210/195 S; 210/202; 210/207; 210/320
[58] Field of Search ............... 210/195 S, 220, 221 R, 210/170, 320, 200, 201, 202, 199, 207, 198 R, 252

[56] References Cited

U.S. PATENT DOCUMENTS

| | | | |
|---|---|---|---|
| 3,195,727 | 7/1965 | Kibbee | 210/195 S |
| 3,355,023 | 11/1967 | Foster | 210/195 S |
| 3,419,146 | 12/1968 | Koulovatos | 210/195 S |
| 3,834,536 | 9/1974 | Kelsey | 210/220 |
| 3,907,672 | 9/1975 | Milne | 210/170 |
| 4,021,347 | 5/1977 | Teller et al. | 210/195 S |

FOREIGN PATENT DOCUMENTS 557304 12/1974 Switzerland ......................... 210/195 S

*Primary Examiner*—Charles N. Hart
*Assistant Examiner*—Benoit Castel
*Attorney, Agent, or Firm*—William C. Babcock

[57] ABSTRACT

An apparatus to transform raw sewage into a substantially colorless and odor free effluent by the alternate action of aerobic and anaerobic bacteria as the sewage flows through a primary chamber and a secondary chamber to a settling chamber and finally to a holding tank from which the effluent discharges to a disposal area.

3 Claims, 3 Drawing Figures

SEWAGE TREATMENT UNIT

This is a continuation of application Ser. No. 720,756 filed Sept. 7, 1976, and now abandoned.

BACKGROUND OF THE INVENTION

1. Field of the Invention
Sewage Treatment Unit.

2. Description of the Prior Art

In the past, in areas not connected to a municipal sewage system, it is a common practice to use septic tanks for the disposition of sewage. Septic tanks, as is well known, are subject to malfunctioning, and are also subject to over flowing.

The primary purpose in devising the present apparatus is to provide means for transforming raw sewage into a substantially colorless and odor free effluent that may easily and conveniently be directed to a disposal area, such as provided by drip lines buried in the ground.

Another object of the invention is to supply a sewage disposal unit in which the raw sewage is agitated at timed intervals by aeration to not only reduce the size of solid materials therein, but to alternately subject the sewage to the action of aerobic and anaerobic bacteria and micro organisms to cause the rapid and efficient transformation of the sewage to an effluent of the type previously identified.

A still further object of the invention is to furnish a sewage disposal unit of a simple mechanical structure, can in the main be fabricated from fiberglass or the like, requires little or no maintenance, and is substantially free of the operational disadvantages of septic tanks and other prior art sewage disposal units.

SUMMARY OF THE INVENTION

The sewage disposal unit includes a rectangular container having first and second ends, and a removable top on which first, second and third man hole covers are secured by fastening means to span first, second and third access openings. The container is preferably buried in the ground at such depth that the cover is between 12" to 36" below the ground surface.

First, second and third transverse partitions are provided within the container and so longitudinally spaced from one another that the interior of the container is subdivided to define a primary aeration chamber, a secondary aeration chamber, a settling chamber and a holding tank. The access openings spanned by the first, second and third man hole covers are in communication with the primary aeration chamber, secondary aeration chamber, and the holding tank.

A raw sewage inlet in the primary aeration chamber is connected by a first line that extends to the sewage discharge of the dwelling, residence or building to be serviced by the unit.

First and second tubes extend downwardly into the first and second aeration chambers, which tubes are connected to a motor driven air pump or blower. The motor has a timing mechanism associated therewith, and as a result pressurized air is discharged to the first and second tubes intermittently for desired periods of time.

The primary aeration chamber has an overflow line extending therefrom to the secondary aeration chamber. When air is discharged under pressure from the first and second tubes, the air becomes temporarily entrained with the sewage in the form of bubbles to define columns of sewage and bubbles that are lighter than the balance of the sewage. The heavier sewage tends to move such columns upwardly in the primary and secondary chambers, and as a result the sewage in the primary and secondary chambers is caused to flow in closed paths in opposite directions. A number of spaced first baffles are provided in the primary chamber. These first baffles have corrugated surfaces that are contacted by solids of substantial size in the sewage. The solids as a result of this contact are substantially reduced in size.

The sewage as it enters the primary chamber contains both aerobic and anaerobic bacteria. During the time that air is discharged into the primary chamber the sewage is aerated, and the growth of aerobic bacteria is stimulated to partially disintegrate the raw sewage. This disintegration is encouraged due to the turbulence created as the sewage flows in a closed path, and all parts of the sewage being exposed to the bacterial action of the aerobic microorganisms.

After the sewage in the primary chamber has been aerated for a period of time, normally two to three hours, the aeration is terminated. The partially disintegrated sewage in the primary chamber is now substantially devoid of free oxygen, and the growth of anaerobic bacteria is encouraged. As the anaerobic bacteria multiply they further disintegrate the sewage, and decompose portions of the sewage not attacked by the aerobic bacteria.

As additional raw sewage flows into the primary chamber it displaces partially disintegrated sewage that by an overflow pipe is transferred to the second chamber where the partially disintegrated sewage is again treated to time spaced cycles of action by aerobic and anaerobic bacteria.

Effluent from the secondary chamber flows over a wier to the settling chamber for final cleaning prior to discharge to the holding tank. A submersible motor driven pump is disposed in the holding tank, which motor is automatically controlled by a limit switch. Thus, the amount of fluid discharged by the pump is controlled. Discharge of effluent from the pump is preferably to a buried drip system adjacent the container. The pressure of the fluid discharged to the drip system is controlled by a pressure relief valve to prevent rupture of the apertured lines. A check valve is provided in the discharge line to prevent back flow. In a situation where the sewage treatment unit is used in a subdivision having street pipe lines, the submersible pump discharges the effluent to these lines. The street lines are preferably connected to a discharge lake and the lift stations normally used are eliminated. From the prior description of the unit it will be seen that the final effluent due to the bacterial action to which the sewage was subjected will be substantially odor free and colorless and of a better quality than most large sewage disposal plants in operation as of the present date produce.

DESCRIPTION OF THE PREFERRED EMBODIMENT

Figure 1:
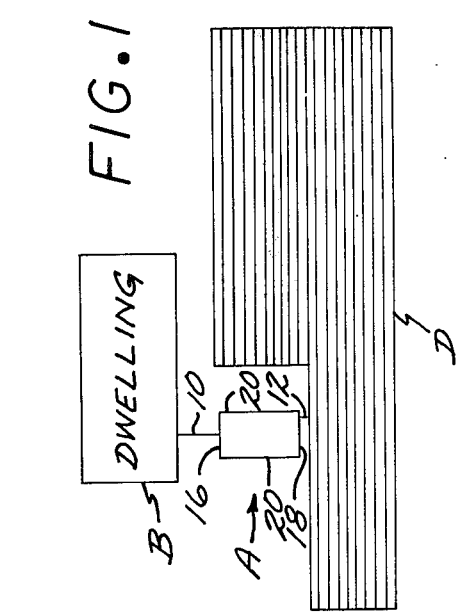
FIG. 1 is a top plan view of the sewage disposal unit and illustrating a typical location thereof relative to a dwelling and effluent disposal area.

The sewage treatment unit A as best seen in FIG. 1 is connected by an underground line 10 to a dwelling B to receive sewage C from the latter, with the sewage after being treated in the unit discharging as a substantially colorless and odorous effluent C-1 therefrom to a line 12 that extends to a disposal area D.

The unit A includes a rectangular container E that is preferably formed from fiberglass or other suitable material that is inert to bacteria, moisture and water. Container E has a bottom 14 connected to first and second end walls 16 and 18, and a pair of side walls 20. The end walls 16 and 18 and pair of side walls 20 terminate on their upper ends in a continuous outwardly extending flange 19. A rectangular top 22 rests on flange 19 and is removably secured thereto by a number of spaced bolts 24.

Figure 2:
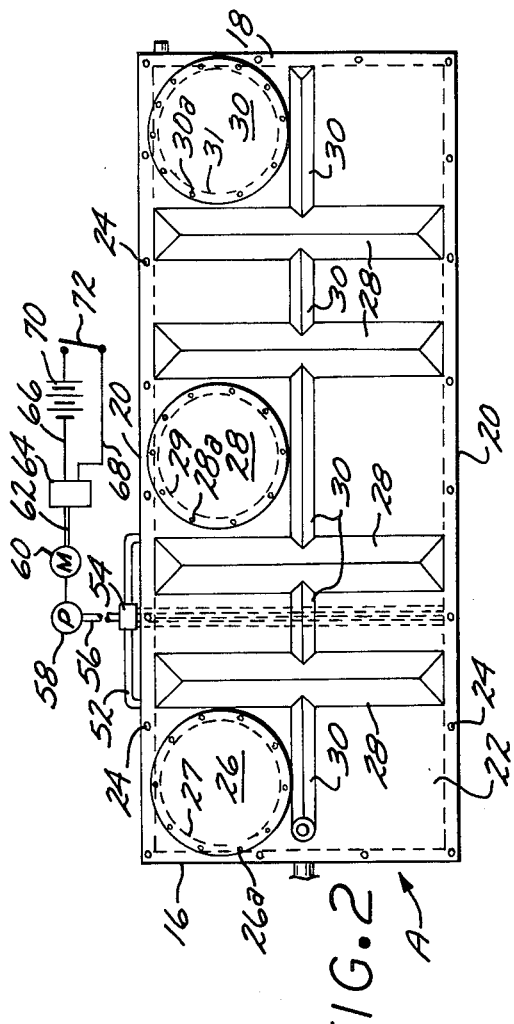
FIG. 2 is a top plan view of the sewage disposal unit.

First, second and third man hole covers 26, 28 and 30 rest on top 22 and span longitudinally spaced first, second and third access openings 27, 29 and 31 formed in the top as best seen in FIG. 2. The man hole covers 26, 28 and 30 are removably secured to top 22 by first, second and third sets of bolts 26a, 28a, and 30a. Top 22 for reinforcing purposes has transverse ribs 28 and a longitudinal rib 30 integrally formed as a part thereof.

Container E adjacent first end wall 16 has a raw sewage inlet pipe 34 extending downwardly therein. Pipe 34 by a fitting 36 is connected to line 10. The fitting 36 includes a clean out opening that is closed by a removable plug 38.

Figure 3:
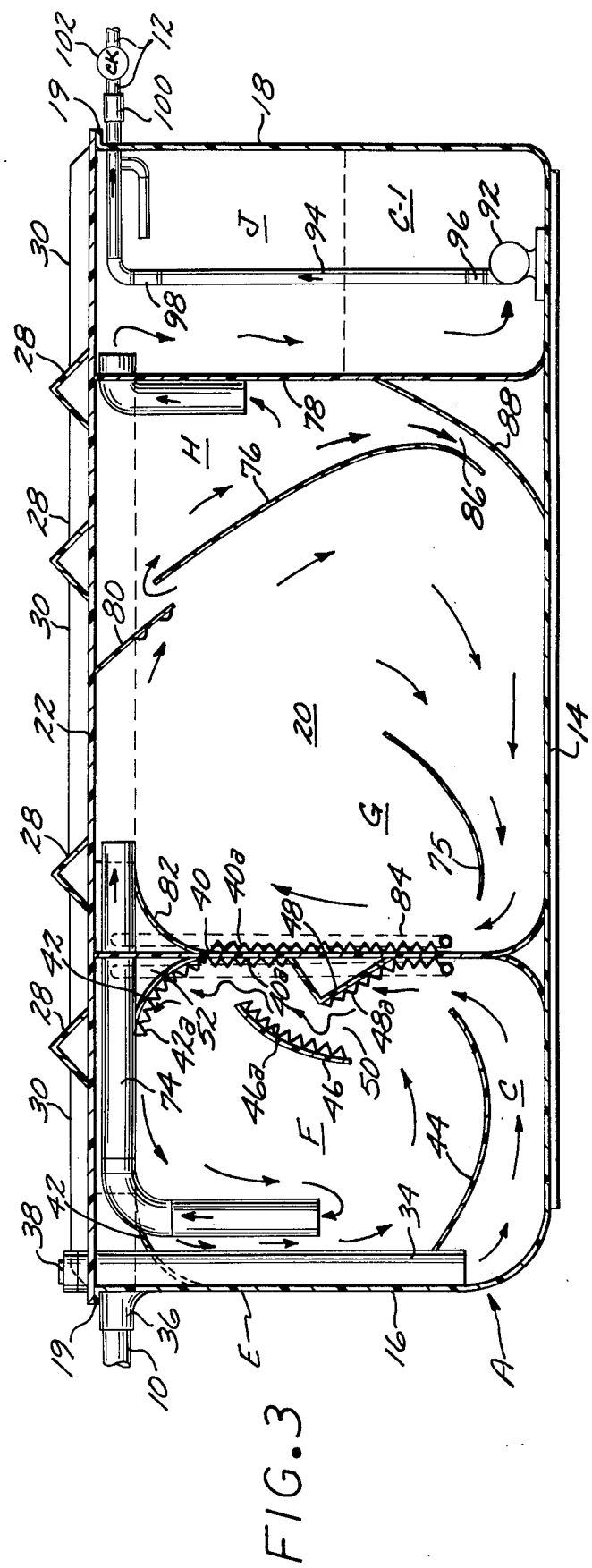
FIG. 3 is a longitudinal cross-sectional view of the unit.

A first transverse partition 40 extends between the side walls 20 as shown in FIG. 3 and cooperates with bottom 14, top 22 and first end wall 16 to define a primary aeration chamber F. Both sides of the first partition 40 have transverse corrugations 40a found thereon. Two transverse arcuate diffuser baffles 42 extend between the pair of side walls 20 adjacent the partition 40 and first end wall 16 as shown in FIG. 3, and the diffusion baffle 42 adjacent first partition 40 having transverse corrugations 42a formed thereon. An arcuate return baffle 44 extends transversely between sidewalls 20 and adjacent bottom 14 as shown in FIG. 3. Two additional baffles 46 and 48 extend transversely between side walls 20. The baffles 46 and 48 have transverse corrugations 46a and 48a on the adjacent sides thereof. Baffles 46 and 48 cooperate to define a passage 50 therebetween.

A first tube 52 extends downwardly into primary areation chamber F adjacent first partition 40. Tube 52 extends to a fitting 54 that by a tube 56 is connected to an air pump 58 that is driven by a motor 60. The motor 60 is connected by a pair of conductors 62 to a timer 64. The timer 64 is connected by a pair of conductors 66 and 68 to a source of electric power 70. Conductor 68 has a normally closed manually operated switch 72 therein.

When air pump 58 is driven air discharges as bubbles from the lower end of tube 52 to create a column of sewage in primary chamber F with which the bubbles are entrained that is lighter than the balance of the sewage. The heavier sewage flows to displace this lighter column and move the latter upwardly, and in so doing the sewage C in primary chamber F is placed in turbulent motion to flow in the first closed path indicated by the arrows in FIG. 3.

The timer 64 is set to intermittently close the electric circuit for two to three hour time periods, and during each such period air is discharged into the primary chamber F. As the raw sewage C is caused to circulate in primary chamber F, solid portions thereof that are of substantial size are brought into forceful contact with corrugations 42a, 46a and 48a and broken into smaller parts.

The raw sewage C as it enters primary chamber F contains both aerobic and anaerobic bacteria. During the discharge of air into primary chamber F, the growth of aerobic bacteria is encouraged, and these bacteria attack the sewage to partially disintegrate the same. During the time periods that air is not discharged into primary chamber F, the partially disintegrated sewage therein is substantially free of oxygen and the growth of anaerobic bacteria is encouraged. The anaerobic bacteria attack portions of the partially disintegrated sewage that were immune to action by the aerobic bacteria.

As additional raw sewage C flows into the primary chamber F, the partially disintegrated sewage displaced thereby flows through an L-shaped overflow pipe 74 into a secondary aeration chamber G. A tranverse weir baffle 76 and a second transverse partition 78 cooperate with the pair of side walls 20, top 22 and bottom 14 to define the secondary chamber G and a settling chamber H. A transverse skimmer 80 is located in secondary chamber G adjacent the top of weir baffle 76. An arcuate diffuser 82 extends transversely in secondary chamber G between pair of side walls 20 and adjacent the upper portion of first partition 40.

A second tube 84 is connected to fitting 54 and extends downwardly in secondary chamber G adjacent the first partition 40. Air discharging from the lower end of second tube 84 create a turbulent circulation of the partially disintegrated sewage in the secondary chamber, with the sewage that has not previously been disintegrated prior to entering the second chamber G being disintegrated by aerobic and anaerobic bacteria while in the second chamber. The direction of flow of partially disintegrated sewage in the secondary chamber G in a second path during the time that air is discharged into the secondary chamber is indicated by arrows in FIG. 3. Sewage as it flows in the second closed path moves upwardly along the first partition 40, along the tap 22, down the weir baffle 76 across bottom 14 and under a fourth baffle 75, and then upwardly along the first partition.

The settling chamber H receives effluent that flows over the weir 76, and subjects the same to a final cleaning action. Floating particles that remain in the effluent are separated therefrom by the increased velocity of the effluent as it flows through the restricted passage 86 defined by the lower portion of weir baffle 76 and a curved baffle 88 that merges with second partition 78 as may best be seen in FIG. 3. A second L-shaped overflow pipe 90 that extends through the upper portion of second partition 78 allows substantially colorless and odor free effluent to flow from settling chamber H to holding tank J.

A motor driven submersible pump 92 is located in the lower portion of holding tank J and is supplied with electric power by conductors (not shown). The pump 92 has an effluent discharge line 94 connected thereto, and this line having a foot valve 96 and pressure relief valve 98 therein.

The discharge line 94 by a union 100 is connected to the line 12 that extends to the disposal area D that is preferably defined by a number of apertured pipes that provide a buried drip system. An air vent line 102 is connected to line 94 to prevent effluent being siphoned back into the holding tank J. A check valve 102 is provided in line 12 to further prevent backflow of effluent into the holding tank J.

The use and operation of the sewage treatment unit A has been described previously in detail and need not be repeated.

I claim:

1. In combination with a dwelling having a discharge line through which raw sewage containing aerobic and anaerobic bacteria intermittently flows, a unit for transforming said raw sewage to a substantially colorless and odor free effluent prior to the latter being discharged to a disposal facility, said unit including:

a. a substantially rectangular container that has a bottom, first and second end walls, a pair of side walls, and a top removably secured to said container, said container and top of sufficient strength as to be buried a substantial distance below the ground surface;

b. first and second spaced transverse partitions that extend upwardly from said bottom and between said side walls, said first and second transverse partitions terminating below said top, and a transverse arcuate weir baffle that is intermediately disposed between said first and second partitions, said weir baffle having upper and lower horizontal edges, said weir baffle extending between said side walls, said upper and lower horizontal edges spaced from said top and bottom, said first transverse partition, pair of side walls, bottom and first end wall cooperating to define a primary chamber; said second transverse partition, pair of side walls, bottom and second end wall cooperating to define a holding tank; said first and second partitions, said pair of side walls and bottom cooperating to define a secondary chamber; said arcuate weir baffle and second transverse partition cooperating with said pair of side walls to define a settling tank within secondary chamber and in communication with the latter said first partition having corrugations on both vertically extending sides thereof;

c. a raw sewage inlet tube that extends downwardly into said primary chamber;

d. first and second tubes that extend downwardly into said primary and secondary chambers;

e. a plurality of spaced transverse first, second and third baffles in said primary chamber and a fourth transverse baffle in said secondary chamber intermediate said first partition and said weir baffle with at least a portion of said second and third baffles having corrugated surfaces said first baffle of downwardly convex-concave transverse cross-section and adjacently disposed to said bottom, said second baffle intermediately disposed between said first partition and first end wall above said first partition, and said third baffle secured to said first partition and oppositely disposed from said second baffle and spaced therefrom;

f. first power-operated pump means disposed exteriorly of said container for intermittently discharging air under pressure through said first and second tubes for fixed periods of time, said air as it discharges from said first and second tubes forming bubbles in sewage in said primary and secondary chambers, with the portion of said sewage containing bubbles being lighter than the balance of said sewage and said sewage as a result thereof circulating in first and second closed paths in said primary and secondary chambers said sewage as it flows in said first closed path flowing under said first baffle and then upwardly between said second and third baffles and then downwardly adjacent said first end wall to repeat flowing through said first closed path, said sewage as it flows through said second closed path flowing downwardly along the side of said weir baffle most adjacent said first partition and then under said fourth baffle and upwardly along said first partition and under said top towards said weir baffle partition to again flow through said second closed path said sewage as it circulates in said first closed path in said primary chamber having solid portions thereof reduced in size by contact with said corrugations on said second and third baffles and said first partition, said raw sewage in said primary chamber being subjected to primary disintegration by aerobic bacteria and anaerobic bacteria, said primary disintegration of sewage in said primary chamber taking place by aerobic bacteria during the time periods when air discharges therein from said first tube and said sewage is circulating, and said primary disintegration of sewage in said primary chamber taking place by said anaerobic bacteria during the time periods when air is not discharging from said first tube and said sewage as it circulates in said second closed path having solid portions therein reduced in size by contact with said corrugations on said first partition;

g. first overflow means through which partially disintegrated sewage flows from said primary chamber to said secondary chamber to have the disintegration thereof completed by the alternate action of aerobic and anaerobic bacteria therein in the same manner as in said primary chamber, with a portion of said partially disintegrated sewage in said secondary chamber as it circulates flowing over said weir baffle to enter said settling tank;

h. skimmer means that extend downwardly from said top and below the upper extremity of said weir baffle, said skimmer means disposed in said secondary chamber, and said skimmer means minimizing the entrance of said solid particles of sewage into said settling tank;

i. a fifth transverse baffle in said secondary chamber that cooperates with the portion of said weir baffle adjacent said bottom to form a restricted passage through which sewage discharges from said settling tank at increased velocity as said partially disintegrated sewage circulates in said secondary chamber, said increased velocity resulting in solid particles of sewage that may have entered said settling chamber being returned from said settling chamber to said secondary chamber for further disintegration by moving through said second closed path;

j. second overflow means adjacent said top and said second partition through which effluent substantially free of solid particles of sewage flows from said settling chamber to said holding chamber; and k. second power operated pump means in said holding chamber, said second power operated power operated power means including a suction and a discharger; and 1. a conduit connected to said discharge of said second power operated pump means and extending to an effluent disposal location remote from said container.

2. A sewage disposal unit as defined in claim 1 in which said first overflow means is an L-shaped tubular member that has first and second legs, said first leg vertically disposed and situated in said primary chamber, and said second leg horizontally disposed and extending through said first partition into said secondary chamber.

3. A sewage disposal unit as defined in claim 1 in which said second overflow means is an L-shaped tubular member that has first and second legs, said first leg vertically disposed and extending into said settling tank, and said second leg horizontally disposed and extending through said second partition into said holding tank.

* * * * *